United States Patent [19]

Abdala, Jr. et al.

[11] Patent Number: 4,630,895
[45] Date of Patent: Dec. 23, 1986

[54] LCD LIGHTGUIDE

[75] Inventors: Julio Abdala, Jr., Miami; Bernard V. Gasparaitis, Tamarac, both of Fla.

[73] Assignee: Motorola, Inc., Schaumburg, Ill.

[21] Appl. No.: 741,912

[22] Filed: Jun. 6, 1985

[51] Int. Cl.⁴ .............................................. G02F 1/13
[52] U.S. Cl. ..................................... 350/345; 362/31; 362/104; 362/297
[58] Field of Search ................... 350/345; 362/31, 26, 362/27, 297, 298, 301, 104

[56] References Cited

U.S. PATENT DOCUMENTS

| | | | |
|---|---|---|---|
| 2,131,471 | 9/1938 | Carter | 362/31 |
| 2,341,658 | 2/1944 | Salani | 362/297 |
| 2,712,593 | 7/1955 | Merchant | 362/27 |
| 2,965,749 | 12/1960 | Hudson | 362/27 |
| 3,561,145 | 2/1971 | Shotwell | 362/26 X |
| 3,740,540 | 6/1973 | Takeichi et al. | 362/27 |
| 4,059,916 | 11/1977 | Tachihara et al. | 350/345 X |
| 4,258,643 | 3/1981 | Ishikawa et al. | 362/26 X |
| 4,277,817 | 7/1981 | Hehr | 350/345 X |
| 4,486,077 | 12/1984 | Torresdal | 362/31 |

Primary Examiner—L. T. Hix
Assistant Examiner—Brian W. Brown
Attorney, Agent, or Firm—Martin J. McKinley; Joseph T. Downey; Donald B. Southard

[57] ABSTRACT

A backlighted display system includes a liquid crystal display, a flat light guide behind the display, and light emitting diodes (LED's). The light guide is a molded slab of clear polycarbonate material with two planes depressed into its rear surface. Four segmented bordering surfaces are approximately arcuate in shape. The depressed planes, the segmented bordering surfaces, and the rear surface are coated with a reflective white paint. LED holders are integrally molded with the light guide. A central portion of the front surface is optionally textured. The display system provides thin construction with even light distribution across the width of the display, low power consumption, and good outdoor visibility at dusk or dawn.

18 Claims, 7 Drawing Figures

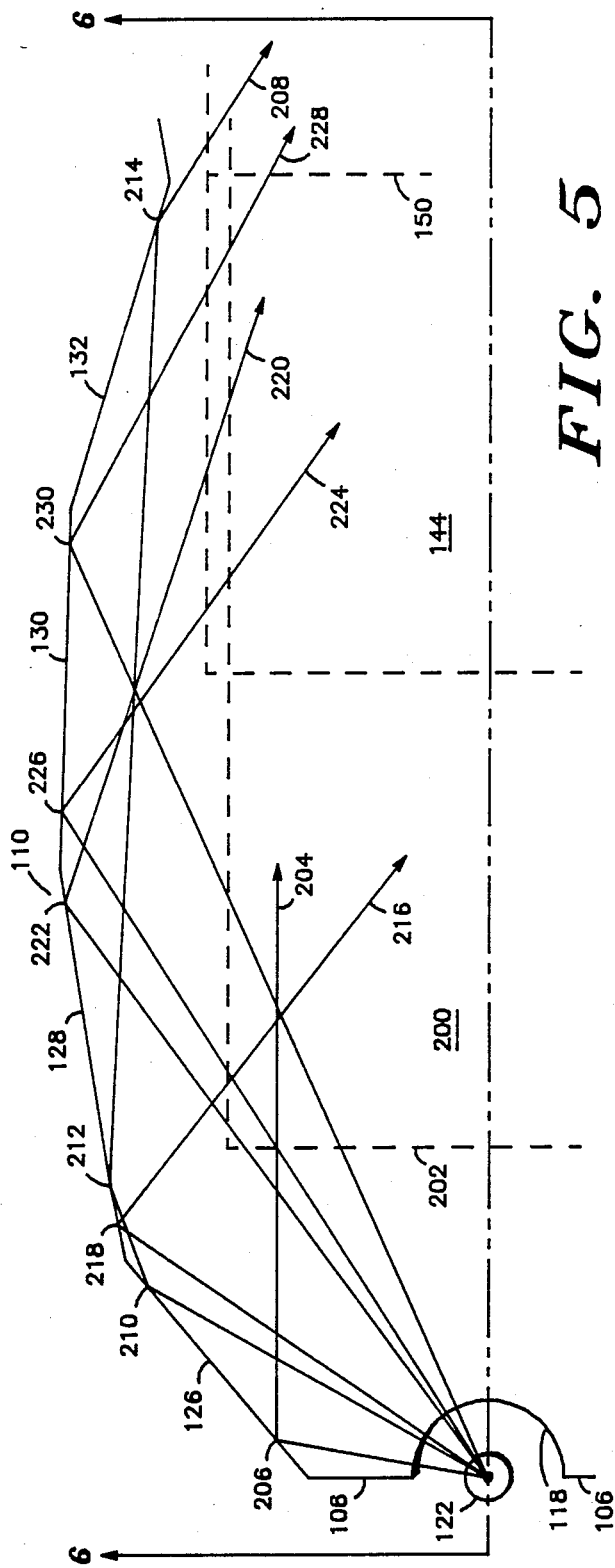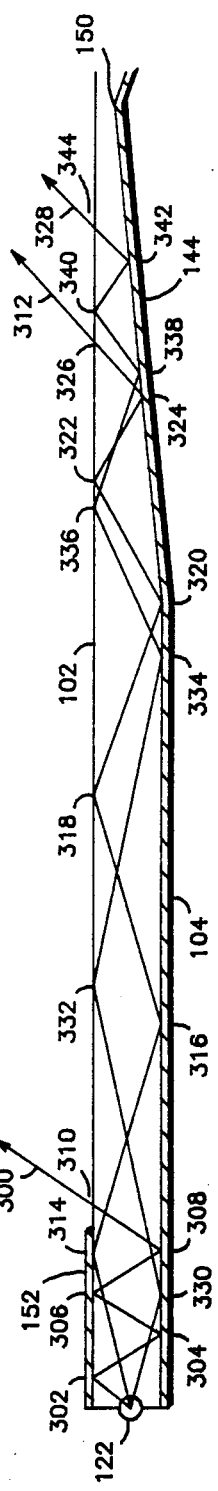
FIG. 5
FIG. 6

LCD LIGHTGUIDE

BACKGROUND OF THE INVENTION

This invention relates to the field of display systems and more particularly to backlighted liquid crystal display systems.

Displays which are capable of forming images of characters or patterns may be broadly broken down into two different categories, active and passive. In active displays, such as light emitting diode (LED) displays, the images are composed of individual diodes which emit their own light. Since active displays are typically characterized by high power consumption, the choice for low power applications, such as portable calculators, watches, portable radios, and pocket pagers, is typically the passive display. An example of a passive display is the liquid crystal display (LCD). Rather than emitting their own light, LCD images merely reflect or absorb light, therefore, ambient sun light or room light is normally required to view the display. When the ambient light intensity is not sufficient to illuminate the display, however, an internal supplemental illumination means is typically provided. In a simple supplemental illumination system one or more light sources, typically incadescent lamps, are placed behind or in front of the display. One of the disadvantages of the simple supplemental illumination system is the creation of "hot spots". "Hot spots" are areas of the display where the light intensity is considerably greater than in other areas. "Hot spots" result in poor display readability. To correct the problem of "hot spots" and to more evenly distribute the light coming from the light sources, a light guide may be positioned behind the liquid crystal display.

A prior art light guide is illustrated in FIGS. 1 and 2. The light guide is normally made from a slab of transparent plastic material generally designated as 10 and has an upper surface 12, a lower surface 14, and four bordering surfaces 16, 18, 20 and 22. Light sources 24 and 26 are positioned respectively in notches 28 and 30 which are located at opposite ends of the slab 10. The bottom surface 14 has two planes 32 and 34 depressed into the bottom surface, thereby forming a V-shaped wedge. The top surface 12 has two areas 36 and 38 which are covered with a reflective coating. A reflective coating also covers the bottom surface 14, the depressed planes 32 and 34, and the bordering surfaces 16, 18, 20 and 22 with the exception of notches 28 and 30 which remain transparent.

In operation, light emitted from the light sources 24 and 26 travels the length of the light guide towards the planes 32 and 34, strikes the reflective surface thereon, and is reflected up through the transparent surface 12. The liquid crystal display (not shown) is situated above front surface 12 and the light passing through the front surface 12 also passes through the liquid crystal display, thereby improving display visibility.

Although this prior art light guide more evenly distributes light across the display then the simple supplemental illumination system, it also has several disadvantages, one of which is its thickness. Thinness is extremely important in the design of small watches, pocket calculators, pocket pagers, portable radios and any other device in which small packaging size is paramount. An acceptable design of a 1.8 inch long prior art guide may only be made as thin as 0.070 inches as measured at the thickest point. Any attempt to make the prior art light guide any thinner, creates an unacceptable distribution of light which results in a wide discrepancy between the intensity of the light emitted at one point on the front surface 12 and another point.

The problem is illustrated graphically in FIG. 7, wherein the vertical axis 50 plots the normalized intensity of light emitted from the front surface 12. The horizontal axis 52 plots the position (that the intensity is measured at) along the sectional line 2—2 (FIG. 1). Point 54 on horizontal axis 52 indicates the position of the left-most light source 24, point 56 indicates the position of the right most light source 26, and point 58 is a position equidistant between the two light sources. The graph is normalized, such that the intensity of position 54 and 56 is 1.0 (both sources are assumed to be of equal intensity).

The curve indicated by dotted line 60 represents the graph of a thin prior art light guide showing its distribution of light intensity across the width of the light guide. Specifically, the dip at point 62, being 70% below the intensity at points 64 and 66, is unacceptable to the average viewer. Curve 60, also illustrates another disadvantage associated with thin prior art light guides, the problem of "hot spots". Hot spots are indicated at points 68 and 70 on curve 60 and are characterized graphically as peaks in the curve.

Generally, prior art light guides are characterized by light transmission inefficiency. To compensate for this, incadescent lamps are used as light sources because they emit more intense light than other light sources of equivalent physical size. The use of the higher intensity incadescent lamps, however, requires additional power consumption, a disadvantage in electronic equipment generally, but a particular difficulty in battery operated equipment where power consumption is critical.

Furthermore, when using liquid crystal displays special problems arise when attempting to view the display outdoors at dusk or dawn. At these times, atmospheric conditions cause a shift in the ambient solar light spectrum towards the red. Because of the disportionately greater amount of red light in the atmosphere at these times, it would be advantageous to have a light source that had a spectral output at a wavelength considerably shorter than that of red light. Incandescent bulbs, with their characteristic white light output, are therefore not well suited for dusk or dawn visibility. Filtering an incadescent bulb would not provide a solution, because filtering merely selectively eliminates a large portion of the visible light spectrum, instead of increasing the intensity of light at the desired wavelength.

SUMMARY OF THE INVENTION

It is an object of the invention to provide an improved backlighted liquid crystal display system.

It is another object of the invention to provide a backlighted liquid crystal display system that is very thin, yet has an even distribution of back light intensity.

It is another object of the invention to provide a backlighted liquid crystal display system that eliminates the hot spots found in prior art display systems.

It is another object of the invention to provide a backlighted liquid crystal display system that has lower power consumption than prior art devices.

It is another object of the invention to provide a backlighted display system that provides good visibility when operated at dusk or dawn.

Still another object of the invention is to provide a backlighted liquid crystal display system having a light guide that can be manufactured as a one piece molded part.

Briefly, the invention comprises a display system including a liquid crystal display and a light guide positioned behind the display. The light guide is made from a transparent slab of material of substantially uniform thickness. The slab has a front surface adjacent the display and an opposing rear surface. Six bordering surfaces, substantially perpendicular to the front and rear surfaces, complete the enclosure.

Two of the bordering surfaces are substantially mutually parallel and are located at opposite ends of the slab. The remaining four bordering surfaces are substantially arcuate in shape.

The rear surface has two centrally located substantially rectangular planes depressed into it. One edge of each plane intersects the rear surface and the opposite edges mutually terminate at a centerline substantially equidistant between the parallel bordering surfaces and between the front and rear surfaces.

The arcuate bordering surfaces, the rear surface, and the depressed planes have a light reflecting means. Light sources are located adjacent to each of the parallel bordering surfaces.

In another embodiment, the invention includes a liquid crystal display and a light guide positioned behind the display. The light guide is made from a transparent slab of polycarbonate material of substantially uniform thickness. The slab has a centrally textured front surface adjacent the display and an opposing rear surface. Six bordering surfaces, substantially perpendicular to the front and rear surfaces, complete the enclosure.

Two of the bordering surfaces are substantially mutually parallel and are located at opposite ends of the slab. The remaining four bordering surfaces are approximately arcuate in shape and are segmented into a plurality of substantially straight concatenated segments.

The rear surface has two centrally located substantially rectangular planes depressed into it. One edge of each plane intersects the rear surface and the opposite edges mutually terminate at a centerline substantially equidistant between the parallel bordering surfaces and between the front and rear surfaces.

The arcuate bordering surfaces, the rear surface, and the depressed planes are provided with a light reflecting means. Light emitting diodes are located adjacent to each of the parallel bordering surfaces.

In yet another embodiment, the invention includes a liquid crystal display and a light guide positioned behind the display. The light guide is made from a slab of transparent polycarbonate material having a substantially uniform thickness of less than 0.050 inches. The slab has a front surface adjacent the display and an opposing rear surface. Six bordering surfaces, substantially perpendicular to the front and rear surfaces complete the enclosure.

Two of the bordering surfaces are substantially mutually parallel and are located at opposite ends of the slab, the remaining four bordering surfaces are segmented into first, second, third, and fourth substantially straight and respectively concatenated segments. Each of the first segments forms an inside angle of substantially 130° with the adjacent parallel bordering surface. Each of the second segments forms an inside angle of substantially 150° with the adjacent first segment. Each of the third segments forms an inside angle of substantially 170° with the adjacent second segment. Each of the fourth segments forms an inside angle of substantially 165° with the adjacent third segment.

Green light emitting diodes and light emitting diode holders are located adjacent to each of the parallel bordering surfaces.

The front surface has a centrally located textured area, untextured areas adjacent to each of the parallel bordering surfaces, and boundary lines between the textured area and the untextured areas. The boundary lines are parabolic in shape.

The rear surface has two centrally located substantially rectangular planes depressed into it. One edge of each plane intersects the rear surface and the opposite edges mutually terminate at a centerline substantially equidistant between the parallel bordering surfaces. The angle between the two planes is substantially 172°.

The segmented bordering surfaces, the rear surface, and the two depressed planes have a light reflecting means.

BRIEF DESCRIPTION OF THE DRAWINGS

FIG. 5 is a schematic light ray analysis of a portion of the light guide of FIG. 3, as viewed from the transparent front surface.

FIG. 6 is a schematic ray analysis of a cross section of the light guide of FIG. 3, taken along line 6—6 of FIG. 5.

DETAILED DESCRIPTION OF THE PREFERRED EMBODIMENT

Figure 1:
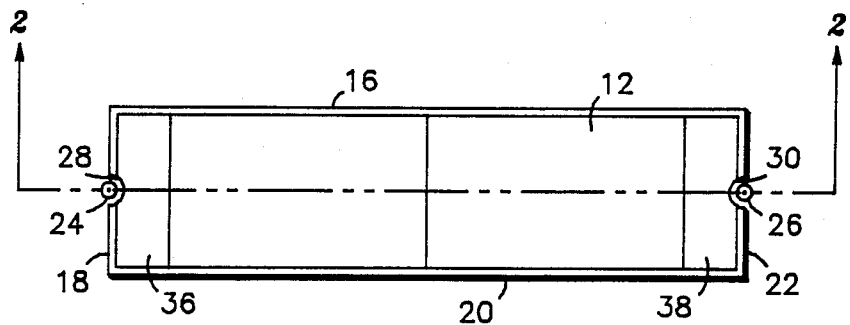
FIG. 1 is a plane view of the transparent front surface of a prior art light guide.
Figure 2:
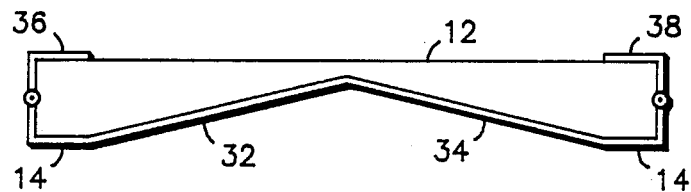
FIG. 2 is a sectional view of the prior art light guide of FIG. 1, taken along the line 2—2 of FIG. 1.
Figure 4:
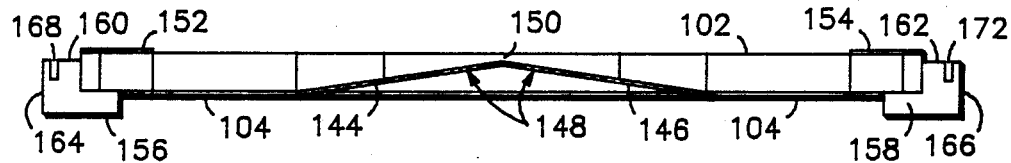
FIG. 4 is a sectional view of the light guide of FIG. 3, taken along the line 4—4 of FIG. 3.
Figure 3:
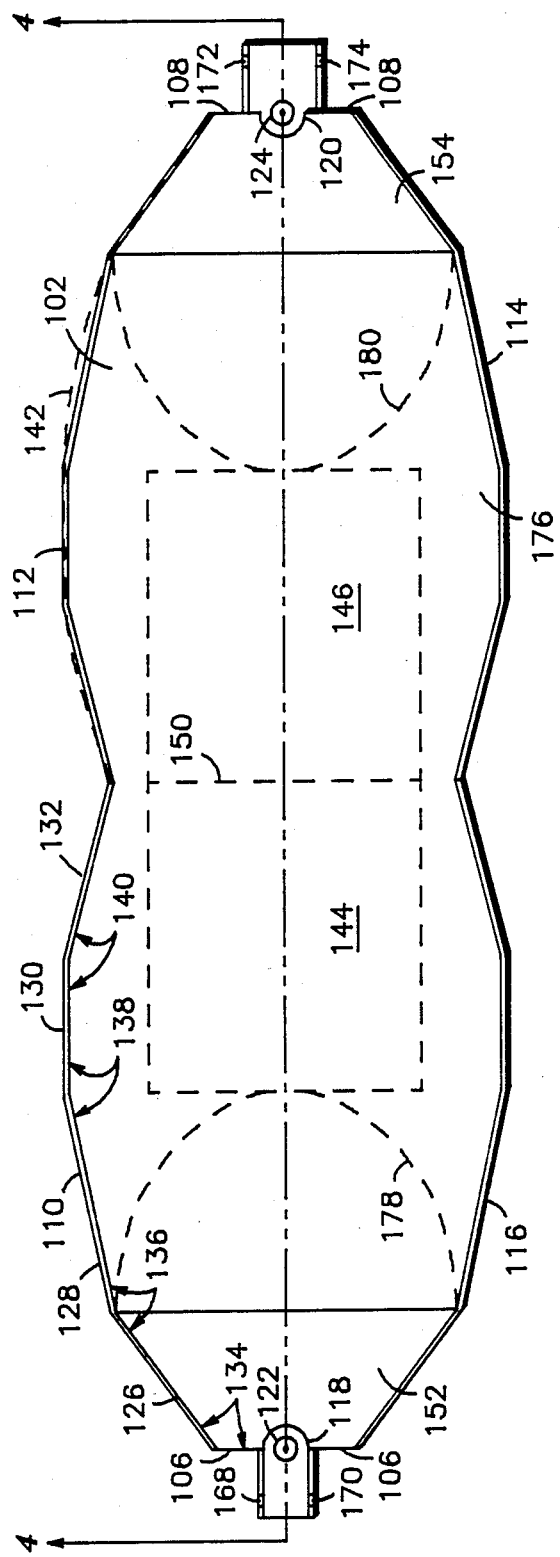
FIG. 3 is a plane view of the light guide of the preferred embodiment of the present invention as viewed from the transparent front surface.

Referring now to FIGS. 3 and 4 wherein the preferred embodiment of the light guide of the present invention is illustrated. The light guide is manufactured from a transparent slab 100, preferably made from LEXAN 141 clear polycarbonate (LEXAN is a trademark of the General Electric Corporation). Although LEXAN 141 is the preferred material for the light guide, other materials such as clear acrylic are also suitable. Clear acrylic has better optical properties than polycarbonate but LEXAN 141 has superior molding properties.

Slab 100 has a front surface 102 adjacent to the liquid crystal display and a rear surface 104 opposite the front surface. The slab 100 has six bordering surfaces 106, 108, 110, 112, 114 and 116 which are substantially perpendicular to the front and rear surfaces. The two bordering surfaces 106 and 108 are mutually parallel and contain indentations 118 and 120 for aligning light sources 122 and 124 respectively. The remaining four bordering surfaces 110, 112, 114 and 116 have an approximate arcuate shape but are each preferably comprised of the concatenation of four straight segments, such as 126, 128, 130 and 132. Bordering surfaces 112, 114 and 116 are also preferrably comprised of four concatenated straight segments as illustrated in FIG. 3, although the segments are not labeled.

In the preferred embodiment segment 126 and bordering surface 106 intersect at an inside angle 134 of 130°. Segments 128 and 126 intersect at an inside angle 136 of 150°. Segments 130 and 128 intersect at an inside angle 138 of 170°. Segments 132 and 130 intersect at an inside angle of 165°. Although bordering surfaces 110, 112, 114, and 116 are shown broken down into four segments, these bordering surfaces may also be comprised of any number of concatenated line segments or even a smooth arc such as is illustrated by the broken line 142 in FIG. 3.

Two planes 144 and 146 are depressed into the bottom surface 104 as shown in FIG. 4. The angle between the planes 148 is preferrably 172°. The thickness of the slab at the center line 150 is 0.015 inches. Reflective material is applied to top surface 102 at areas 152 and 154, to bottom surface 104, to depressed planes 144 and 146, and to bordering surfaces 110, 112, 114, 116. Bordering surfaces 106 and 108 may have a reflective coating but notches 118 and 120 remain transparent. Although any reflective type of coating will suffice, a white surface, such as is provided by a white paint, is preferred because it not only reflects light but also scatters light.

Two light source holders 156 and 158 are integrally molded with the slab 100 and positioned on bordering surfaces 106 and 108. The holders 156 and 158 are basically cup shaped, being open at the top 160 and 162 and on the sides 164 and 166. The exact shape of the cups will depend on the particular light sources 122 and 124 utilized but they are generally designed to provide a close fit between the light sources and the interior walls of the holders 156 and 158. Four notches 168, 170, 172 and 174 are cut into the sides of the holders 156 and 158 such that the leads (not shown) of the light sources 122 and 124 can be bent through the notches, thereby retaining the light sources in their holders.

Optionally, a centrally textured area 176 bounded by lines 178 and 180 may be utilized to improve the light distribution. The preferred shape for the boundary lines 178 and 180 is parabolic.

Referring to FIGS. 3 and 4, the dimensions of the light guide of the preferred embodiment are substantially as follows. The length of the light guide between bordering surfaces 106 and 108 is 1.62 inches. The width of the light guide along centerline 150 is 0.45 inches. Segment 126 is 0.18 inches long; segment 128 is 0.25 inches long; segment 130 is 0.22 inches long; and segment 132 is 0.22 inches long. The thickness of the light guide at its thickest point, not including the lamp holders 164 and 166, is 0.45 inches, while at centerline 150 the depressed light guide is 0.015 inches thick. The depressed planes 144 and 146 are each 0.40 inches wide, as measured along centerline 150, and 0.33 inches long as measured along sectional line 4—4.

The operation of the light guide is illustrated in FIGS. 5 and 6. FIG. 5 is a light ray analysis in the horizontal plane of the light guide, while FIG. 6 is a light ray analysis in the vertical plane of the light guide of the present invention. Referring to FIG. 5, the LCD image area 200 is bounded by dotted line 202. This area is generally rectangular in shape although only one quarter of the total area is illustrated in FIG. 5. As previously discussed, segments 126, 128, 130 and 132 have a reflective coating. Segments 126, 128, 130 and 132 are optimally positioned to reflect into the image area 200 the maximum number of the light rays emitted from any direction of the light source 122.

Specifically, light ray 204 is emitted from light source 122 whereupon its strikes segment 126 at point 206 and is reflected into the image area 200. Light ray 208 is illustrative of a ray that strikes the reflecting surfaces 3 times before being reflected into the image area 200. Ray 208, is emitted from light source 122 and strikes segment 126 at point 210 whereupon it is reflected to segment 128 at point 212. At point 212 it is reflected to line segment 132 at point 214 whereupon it is reflected into the image area 200. Light ray 216 is emitted from light source 122 and strikes segment 128 at point 218 whereupon it is reflected into the image area 200. Light ray 220 is emitted from light source 122 whereupon it strikes segment 128 at point 222 and is reflected into the image area 200. Light ray 224 is emitted from light source 122 whereupon it strikes segment 130 at point 226 and is reflected into the image area 200. Likewise, light ray 228 is emitted from light source 122 whereupon it strikes segment 130 at point 230 and is reflected into the image area 200.

The law of total internal reflection is well known in the art and states that under certain conditions a light ray impinging upon a transparent surface will be totally reflected from that surface if the angle of incidence is more than the critical angle. The critical angle is a function of the difference between the index of refraction of the two media (slab material and air). The behavior of three light rays in the vertical plane of the slab is illustrated in FIG. 6. Light ray 300 is emitted from light source 122 and strikes the reflective area 152 of upper surface 102 at points 302 and 306 and also the reflective rear surface 104 at points 304 and 308. At all these points, 302, 304, 306, and 308, the light ray 300 is reflected according to the well known principle that the angle of incidence equals the angle of reflection. After being reflected from the lower surface 104 at point 308, the light ray strikes the upper surface 102 at point 310. At point 310 the angle of incidence is less than the critical angle so the light ray passes through the transparent surface 102 and through the liquid crystal display (not shown, but located above the slab 100).

Light ray 312 originates from light source 122 and strikes reflective area 152 of upper surface 102 at point 314 whereupon it is reflected down to the lower reflective surface 104 at point 316. At point 316, light ray 312 is reflected up to the transparent upper surface 102 at point 318. At point 318, the angle of incidence is greater than the critical angle, so light ray 312 is reflected back down towards the lower surface, whereupon it strikes the depressed plane 144, also having a reflective coating, at point 320. At point 320 light ray 312 is again reflected up towards the upper surface 102, whereupon it strikes the upper surface 102 at point 322. Again the angle of incidence is greater than the critical angle, so light ray 312 is reflected down and strikes depressed plane 144 at point 322 whereupon it is reflected up towards upper surface 102. Light ray 312 strikes upper surface 102 at point 326, however, this time the angle of incidence is less than the critical angle so light ray 312 passes through upper surface 102 and through the liquid crystal display (not shown).

Light ray 328 is emitted from light source 122 whereupon it strikes reflective lower surface 104 at point 330 and is reflected up towards transparent upper surface 102 at point 332. Because the angle of incidence is greater than the critical angle, the light ray 328 is reflected back down towards reflective lower surface 104 at point 334. After striking the lower surface at point 334, light ray 328 is reflected back up towards transparent front surface 102 at point 336. Again, because of the angle of incidence is greater than the critical angle light ray 328 is reflected back down towards depressed plane 144 whereupon it strikes plane 144 at point 338 and is reflected up towards transparent front surface 102 at point 340. Again the angle of incidence is greater than the critical angle and the ray is reflected back down towards reflective depressed plane 144 at point 342 upon which it is reflected up towards transparent front surface 302 to point 344. At point 344, however, the angle of incidence is less than the critical angle so light ray 328 passes through transparent front surface 102 and through the liquid crystal display (not shown).

Figure 7:
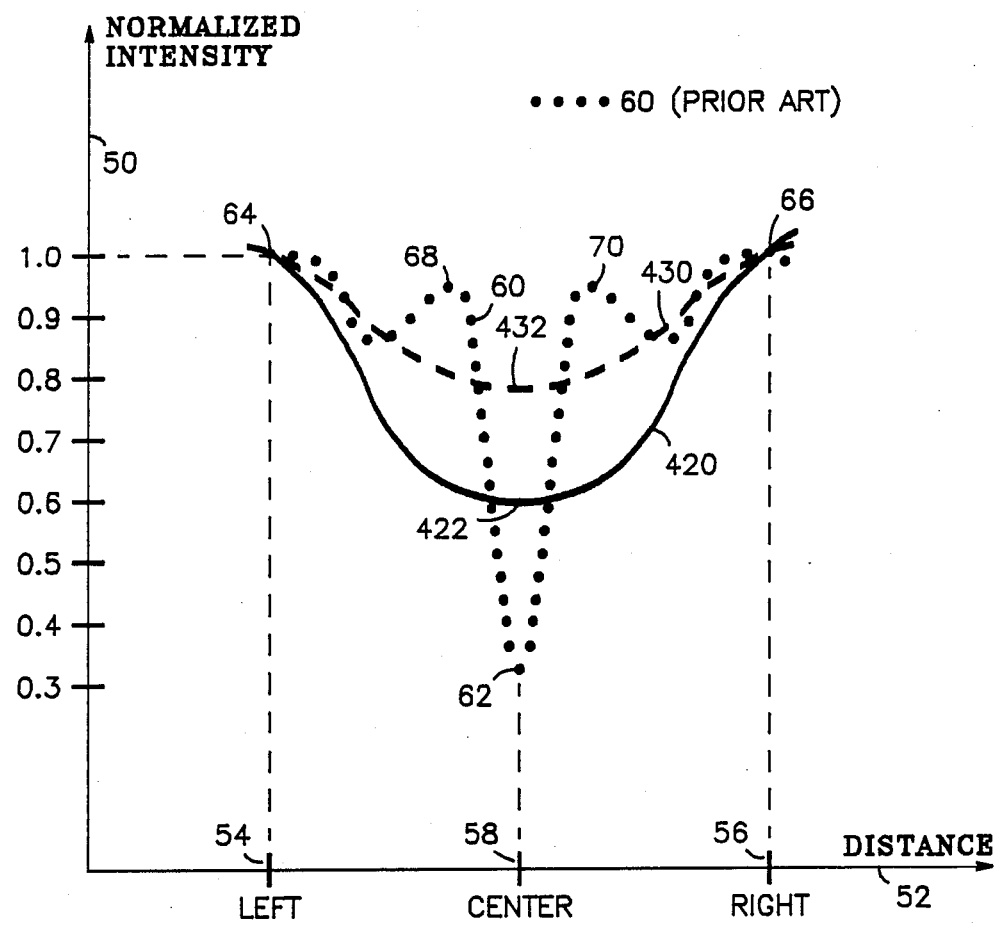
FIG. 7 is a graph of light intensity versus distance along the dimension line between the sources of the light guide. Curves are shown for a prior art light guide, the light guide of the preferred embodiment, and the preferred light guide with the optional central texturing.

FIG. 7 shows the performance of various light guides. The vertical axis 50 indicates the normalized intensity of light being emitted from the front surface of a light guide. Horizontal axis 52 plots the position (that the intensity is measured at) along a line drawn between the two light sources, such as sectional line 4—4 in FIG. 3. Appropriate markings indicate the position of the left most light source 54, the center of the light guide 58, and the right most light source 56.

The curve indicated by dotted line 60 represents the performance of a thin prior art light guide. The dip 62 indicates an unacceptable distribution of light across the light guide as described earlier. "Hot spots" are indicated by points 68 and 70.

Solid line 420 represents the performance of the light guide of the preferred embodiment illustrated in FIG. 3 but without the optional textured area 176. It is to be noted that curve 420 does not have the "hot spots" 68 and 70 characteristic of the prior art light guide. Curve 420 shows a dip at point 422 but it is only 40% below the intensity at position 54 or 56.

Curve 430 represents the light guide of the present invention having the optional textured area 176. Again, the absence of hot spots 68 and 70 are to be noted and more particularly the dip at 432 is only about 20% down from the intensity at position 54 or 56.

The light guide of the present invention offers even light distribution across the width of the guide and eliminates "hot spots". To the human eye, variations in the light intensity across the width of the light guide of the present invention are barely perceptible, if at all. Because of its higher efficiency, the light guide of the present invention permits the use of lower power LED's as light sources, thereby providing a savings in battery drain when the display system is used in battery powered equipment.

Although any color LED may be used, the preferred embodiment has been optimally designed for use with green LED's which provide superior outdoor performance at dusk or dawn over other colored or white light sources. The light guide, including the light source holders 156 and 158, can be molded as a one piece unitary structure.

We claim:

1. A display system, comprising in combination:
   a liquid crystal display;
   a light guide positioned behind said display;
   said light guide including a transparent slab of substantially uniform thickness, said slab having a front surface adjacent said display, a rear surface opposing said front surface, and six bordering surfaces substantially perpendicular to said front and rear surfaces, completing the enclosure of said slab;
   two of said bordering surfaces being substantially mutually parallel and located at opposite ends of said slab, the remaining four of said bordering surfaces being substantially arcuate in shape;
   said rear surface having two planes centrally located and depressed into said rear surface, said planes being substantially rectangular with one edge of each of said planes intersecting said rear surface and the opposite edges mutually terminating at a centerline located substantially equidistant between said parallel bordering surfaces, said centerline being located between said front and rear surfaces;
   said arcuate bordering surfaces, said rear surface, and said depressed planes having a means for reflecting light; and
   a light source located adjacent to each of said parallel bordering surfaces.

2. The display system of claim 1, wherein each of said arcuate bordering surfaces are segmented into a plurality of substantially straight concatenated segments.

3. The display system of claim 2, wherein:
   each of said arcuate bordering surfaces has a first, second, third, and fourth segment, respectively concatenated; wherein each of said first segments is concatenated to one of said parallel bordering surfaces and each of said fourth segments is concatenated to the fourth segment in the adjoining arcuate bordering surface.
   each of said first segments forms an inside angle of substantially 130° with the adjacent said parallel bordering surface;
   each of said second segments forms an inside angle of substantially 150° with the adjacent said first segment;
   each of said third segments forms an inside angle of substantially 170° with the adjacent said second segment.
   each of said fourth segments forms an inside angle of substantially 165° with the adjacent said third segment.

4. The display system of claim 1, further comprising means for holding said light sources, said holding means being located at each of said parallel bordering surfaces.

5. The display system of claim 4, wherein said light sources are light emitting diodes.

6. The display system of claim 5, wherein said light emitting diodes emit green light.

7. The display system of claim 1, wherein said reflecting means includes a means for scattering light.

8. The displays system of claim 7, wherein said reflecting means is a white paint.

9. The display system of claim 1, wherein said front surface has a centrally located textured area, and untextured areas adjacent to each of said parallel bordering surfaces;

10. The display system of claim 9, wherein said front surface has two boundaries between said textured area and said untextured areas, said boundaries being parabolic in shape.

11. A display system, comprising in combination:
    a liquid crystal display;
    a light guide positioned behind said display;
    said light guide including a transparent polycarbonate slab of substantially uniform thickness, said slab having a centrally textured front surface adjacent said display, a rear surface opposing said front surface, and six bordering surfaces substantially perpendicular to said front and rear surfaces, completing the enclosure of said slab;

two of said bordering surfaces are substantially mutually parallel and located at opposite ends of said slab, the remaining four of said bordering surfaces are each segmented into a plurality of substantially straight concaterrated segments, said segmented bordering surfaces are each approximately arcuate in shape;

said rear surface having two planes centrally located and depressed into said rear surface, said planes being substantially rectangular with one edge of each of said planes intersecting said rear surface and the opposite edges mutually terminating at a centerline located substantially equidistant between said parallel bordering surfaces, said centerline being located between said front and rear surfaces;

said segmented bordering surfaces, said rear surface, and said depressed planes having a means for reflecting light; and light emitting diodes located adjacent to each of said parallel bordering surfaces.

12. The display system of claim 11, wherein:

each of said segmented bordering surfaces includes first, second, third and fourth substantially straight segments, respectfively concatenated;

each of said first segments forms an inside angle of substantially 130° with the adjacent said parallel bordering surface;

each of said second segments forms an inside angle of substantially 150° with the adjacent said first segment;

each of said third segments forms an inside angle of substantially 170° with the adjacent said second segment.

each of said fourth segments forms an inside angle of substantially 165° with the adjacent said third segment.

13. The display system of claim 11, further comprising means for holding said light emitting diodes, said holding means being located at each of said parallel bordering surfaces.

14. The display system of claim 13, wherein said light emitting diodes emit green light.

15. The display system of claim 11, wherein said reflecting means includes a means for scattering light.

16. The display system of claim 15, wherein said reflecting means is a white paint.

17. The display system of claim 11, said front surface further comprising:

an untextured area adjacent to each of said parallel bordering surfaces; and a boundary line between said textured and untextured areas, said boundary line being parabolic in shape.

18. A display system, comprising in combination:

a liquid crystal display;

a light guide positioned behind said display;

said light guide including a transparent polycarbonate slab having a substantially uniform thickness of less than 0.050 inches, said slab having a front surface adjacent said display, a rear surface opposing said front surface, and six bordering surfaces substantially perpendicular to said front and rear surfaces, completing the enclosure of said slab;

two of said bordering surfaces being substantially mutually parallel and located at opposite ends of said slab, the remaining four of said bordering surfaces being segmented and each having first, second, third and fourth substantially straight and respectively concaterrated segments.

each of said first segments forms an inside angle of substantially 130° with the adjacent said parallel bordering surface;

each of said second segments forms an inside angle of substantially 150° with the adjacent said first segment;

each of said third segments forms an inside angle of substantially 170° with the adjacent said second segment.

each of said fourth segments forms an inside angle of substantially 165° with the adjacent said third segment.

green light emitting diodes and light emitting diode holders are located adjacent to each of said parallel bordering surfaces;

said front surface having a textured area, untextured areas adjacent to each of said parallel bordering surfaces, and boundary lines between said textured areas, said boundary lines being parabolic in shape;

said rear surface having two planes centrally located and depressed into said rear surface, said planes being subtantially rectangular with one edge of each of said planes intersecting said rear surface and the opposite edges mutually terminating at a centerline located substantially equidistant between said parallel bordering surfaces, said centerline being located between said front and rear surfaces; the angle between said two planes being substantially 172°; and said four segmented bordering surfaces, said rear surface, and said two depressed planes having a coating of a reflective paint.

* * * * *